(12) United States Patent
Poole et al.

(10) Patent No.: US 12,243,302 B2
(45) Date of Patent: Mar. 4, 2025

(54) UTILIZING MACHINE LEARNING MODELS TO CLASSIFY VEHICLE TRAJECTORIES AND COLLECT ROAD USE DATA IN REAL-TIME

(71) Applicant: Accenture Global Solutions Limited, Dublin (IE)

(72) Inventors: Andrew Poole, Dublin (IE); Anthony Mccoy, Dublin (IE); Antonio Penta, Dublin (IE); Phillip Lynch, Bettystown (IE)

(73) Assignee: Accenture Global Solutions Limited, Dublin (IE)

( * ) Notice: Subject to any disclaimer, the term of this patent is extended or adjusted under 35 U.S.C. 154(b) by 345 days.

(21) Appl. No.: 17/972,940

(22) Filed: Oct. 25, 2022

(65) Prior Publication Data

US 2024/0135705 A1   Apr. 25, 2024
US 2024/0233369 A9   Jul. 11, 2024

(51) Int. Cl.
*G06V 20/10*   (2022.01)

(52) U.S. Cl.
CPC ................................. *G06V 20/182* (2022.01)

(58) Field of Classification Search
CPC ....... G06V 20/182; G06V 10/70; G06V 20/54
See application file for complete search history.

(56) References Cited

U.S. PATENT DOCUMENTS

| | | | | |
|---|---|---|---|---|
| 11,928,862 | B2 * | 3/2024 | Livne | G06Q 50/40 |
| 2008/0273751 | A1 * | 11/2008 | Yuan | G06T 7/579 |
| | | | | 382/103 |
| 2016/0210512 | A1 * | 7/2016 | Madden | G06V 20/52 |
| 2021/0403034 | A1 * | 12/2021 | Lapin | B60W 60/0027 |
| 2022/0126864 | A1 * | 4/2022 | Moustafa | G06T 1/0007 |
| 2023/0092984 | A1 * | 3/2023 | Kim | G06T 15/10 |
| | | | | 382/103 |
| 2023/0138686 | A1 * | 5/2023 | Shaag | G06T 7/80 |
| | | | | 701/301 |
| 2023/0191608 | A1 * | 6/2023 | Horowitz | B25J 9/1697 |
| | | | | 700/245 |
| 2023/0211801 | A1 * | 7/2023 | Hendler | G06V 40/10 |
| | | | | 701/23 |
| 2024/0029446 | A1 * | 1/2024 | Kassel | G06V 20/582 |
| 2024/0135705 | A1 * | 4/2024 | Poole | G06V 20/182 |

* cited by examiner

*Primary Examiner* — Solomon G Bezuayehu
(74) *Attorney, Agent, or Firm* — Polsinelli PC

(57) ABSTRACT

A device may receive tracking data identifying trajectories of objects, and may annotate the tracking data to identify object categories for the tracking data. The device may identify objects based on the object categories, and may determine object trajectories for the objects. The device may transform the object trajectories to overhead planar trajectories, and may generate simplified object trajectories. The device may convert a continuous space associated with the simplified object trajectories into a discrete space, and may convert the discrete space to a lower dimensional space. The device may transform the object trajectories to binary feature vectors, and may process the binary feature vectors, with a clustering model, to determine trajectory clusters. The device may train a classification model with the binary feature vectors and the trajectory clusters, and may cause the trained classification model to be implemented.

20 Claims, 16 Drawing Sheets

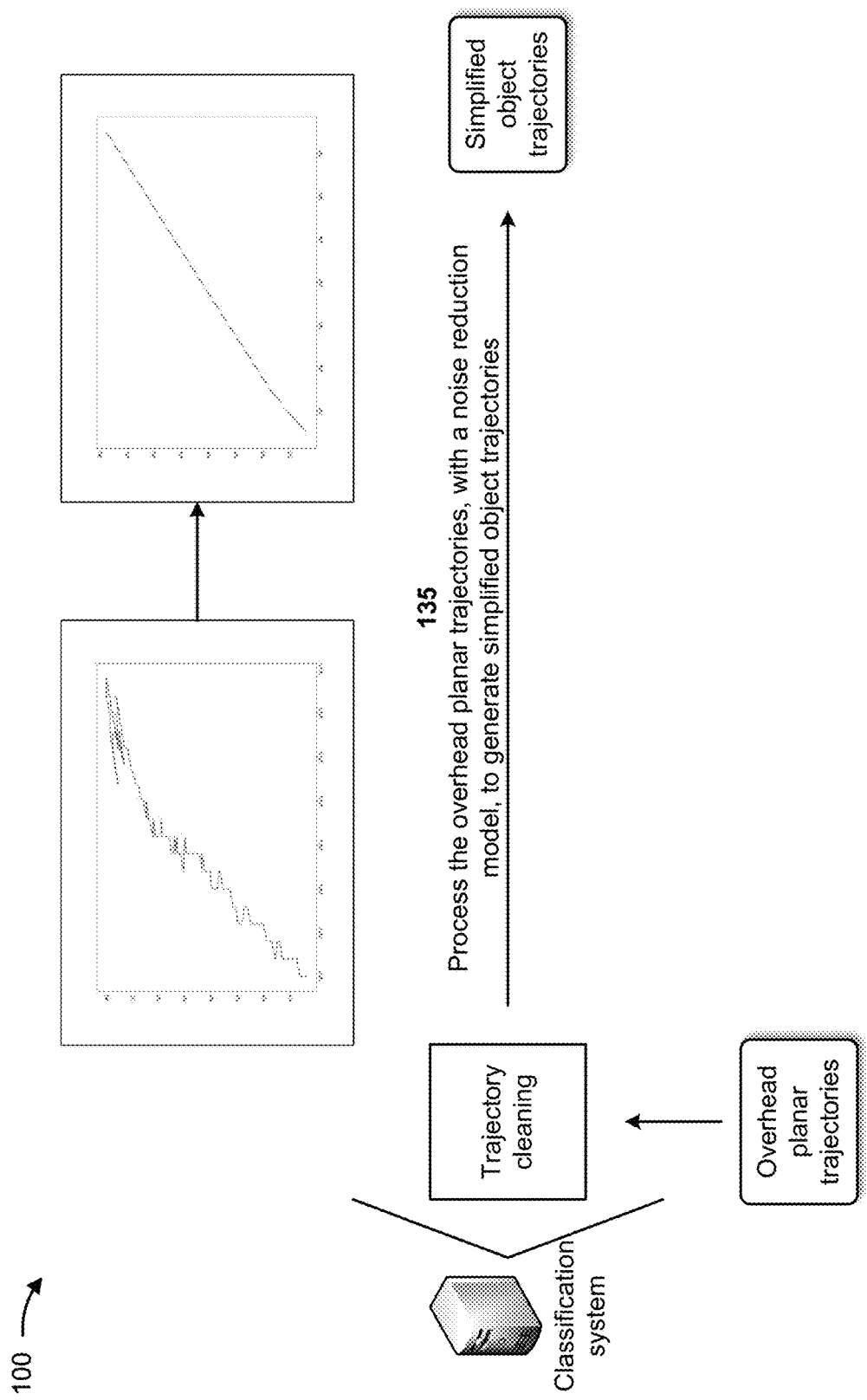

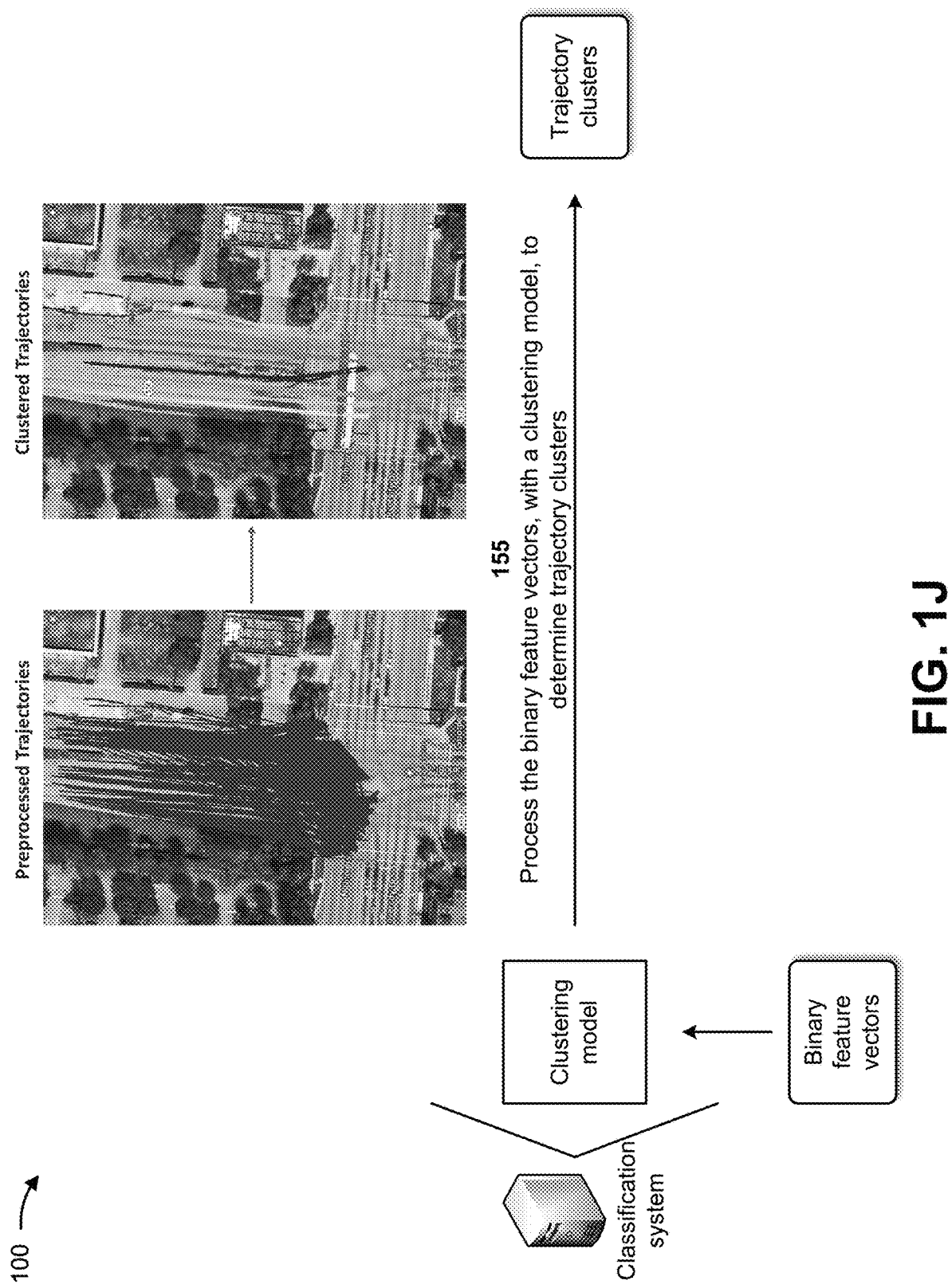

UTILIZING MACHINE LEARNING MODELS TO CLASSIFY VEHICLE TRAJECTORIES AND COLLECT ROAD USE DATA IN REAL-TIME

BACKGROUND

A traffic video camera may capture video streams of vehicles traveling on roadways. Such video streams may be utilized to determine traffic violations, such as running a red light, failing to stop at a stop sign, and/or the like.

SUMMARY

Some implementations described herein relate to a method. The method may include receiving tracking data identifying trajectories of objects, and annotating the tracking data to identify object categories for the tracking data. The method may include utilizing an object detection model to identify the objects based on the object categories, and processing the objects, with a multi-object tracking model, to determine object trajectories for the objects. The method may include utilizing planar homography to transform the object trajectories to overhead planar trajectories, and processing the overhead planar trajectories, with a noise reduction model, to generate simplified object trajectories. The method may include converting a continuous space associated with the simplified object trajectories into a discrete space, and utilizing a Hilbert curve with the discrete space to convert the discrete space to a lower dimensional space. The method may include utilizing the lower dimensional space and the discrete space to transform the object trajectories to binary feature vectors, and processing the binary feature vectors, with a clustering model, to determine trajectory clusters. The method may include training a classification model, with the binary feature vectors and the trajectory clusters, to generate a trained classification model, and performing one or more actions based on the trained classification model.

Some implementations described herein relate to a device. The device may include one or more memories and one or more processors coupled to the one or more memories. The one or more processors may be configured to receive video data that includes image frames identifying vehicles traveling on roadways, and annotate the image frames to identify object categories for the video data. The one or more processors may be configured to utilize a single-stage object detection network model to identify objects in the image frames based on the object categories, and process the objects, with a deep simple real-time tracker model, to determine object trajectories for the objects. The one or more processors may be configured to utilize planar homography to transform the object trajectories to overhead planar trajectories, and process the overhead planar trajectories, with a noise reduction model, to generate simplified object trajectories. The one or more processors may be configured to convert a continuous space associated with the simplified object trajectories into a discrete space, and utilize a Hilbert curve with the discrete space to convert the discrete space to a lower dimensional space. The one or more processors may be configured to utilize the lower dimensional space and the discrete space to transform the object trajectories to binary feature vectors, and process the binary feature vectors, with a clustering model, to determine trajectory clusters. The one or more processors may be configured to train a classification model, with the binary feature vectors and the trajectory clusters, to generate a trained classification model, and perform one or more actions based on the trained classification model.

Some implementations described herein relate to a non-transitory computer-readable medium that stores a set of instructions for a device. The set of instructions, when executed by one or more processors of the device, may cause the device to receive video data that includes image frames identifying vehicles traveling on roadways, and annotate the image frames to identify object categories for the video data. The set of instructions, when executed by one or more processors of the device, may cause the device to utilize an object detection model to identify objects in the image frames based on the object categories, and process the objects, with a multi-object tracking model, to determine object trajectories for the objects. The set of instructions, when executed by one or more processors of the device, may cause the device to utilize planar homography to transform the object trajectories to overhead planar trajectories, and process the overhead planar trajectories, with a noise reduction model, to generate simplified object trajectories. The set of instructions, when executed by one or more processors of the device, may cause the device to convert a continuous space associated with the simplified object trajectories into a discrete space, and utilize a Hilbert curve with the discrete space to convert the discrete space to a lower dimensional space. The set of instructions, when executed by one or more processors of the device, may cause the device to utilize the lower dimensional space and the discrete space to transform the object trajectories to binary feature vectors, and process the binary feature vectors, with a clustering model, to determine trajectory clusters. The set of instructions, when executed by one or more processors of the device, may cause the device to train a classification model, with the binary feature vectors and the trajectory clusters, to generate a trained classification model, and cause the trained classification model to be implemented with real-time video data.

BRIEF DESCRIPTION OF THE DRAWINGS

FIGS. 1A-1L are diagrams of an example implementation described herein.

DETAILED DESCRIPTION

Figure 1A:
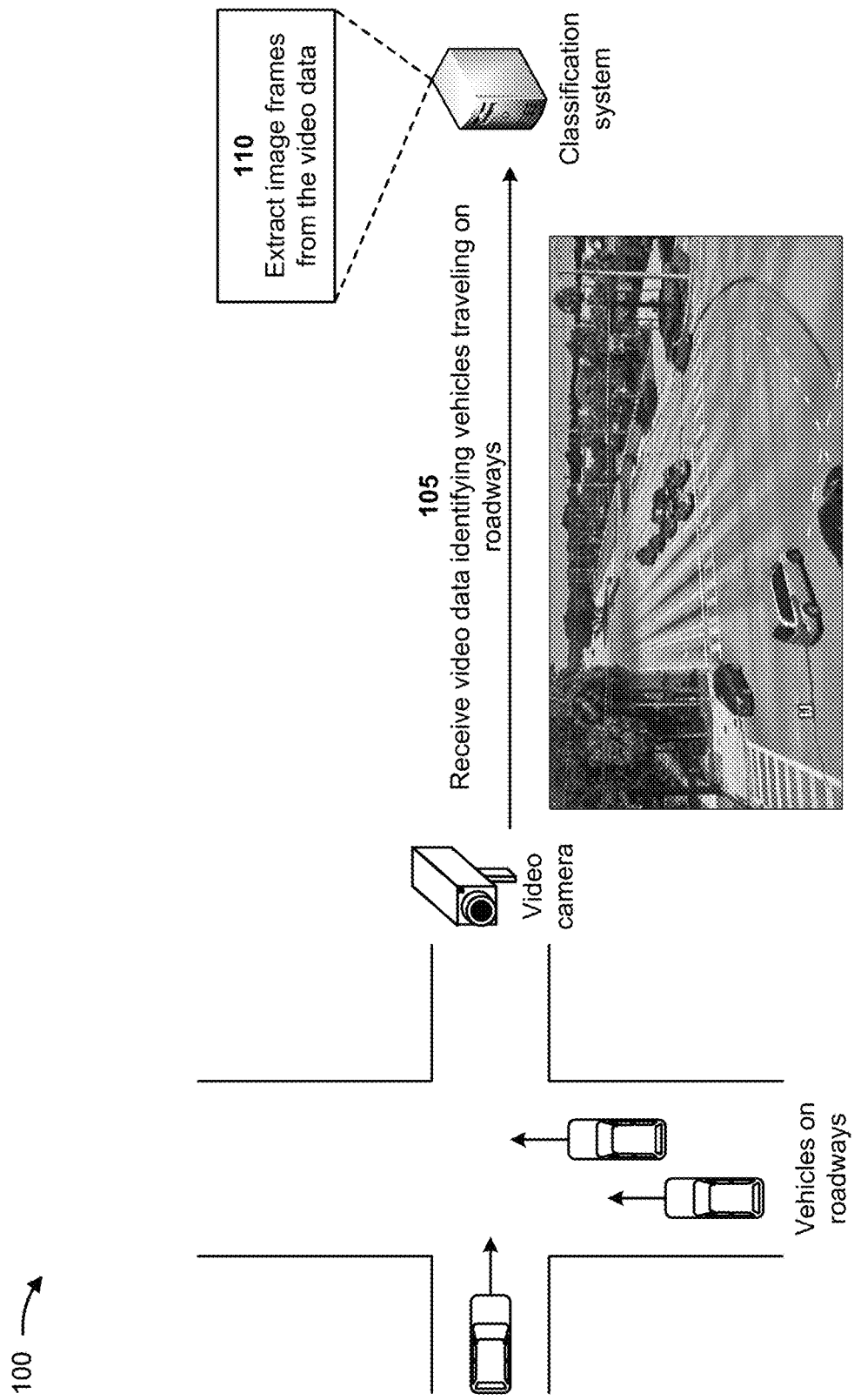

The following detailed description of example implementations refers to the accompanying drawings. The same reference numbers in different drawings may identify the same or similar elements.

A roadway may include active video cameras that assist various services, such as intelligent traffic monitoring, emergency vehicle detection and monitoring, and/or the like. The video cameras may collect video data that is processed to calculate trajectory paths of vehicles in the roadway. However, current techniques for calculating trajectory paths fail to determine the trajectory paths in real-time. For example, to classify a trajectory into a cluster of similar trajectories, a distance matrix must be calculated against all historically collected trajectories and then utilized to model a new set of clusters. This technique is infeasible in a real-time scenario due to computational cost. Therefore, current techniques for processing video data captured by a video camera consume computing resources (e.g., processing resources, memory resources, communication resources, and/or the like), networking resources, and/or the like associated with failing to calculate trajectory paths of vehicles in real-time, generating incomplete or incorrect trajectory paths of vehicles, utilizing the incomplete or incorrect trajectory paths of vehicles to incorrectly manage a roadway (e.g., which may cause traffic congestion, traffic accidents, and/or the like), and/or the like.

Some implementations described herein relate to a classification system that utilizes machine learning models to classify vehicle trajectories and collect road use data in real-time. For example, the classification system may receive video data that includes image frames identifying vehicles traveling on roadways, and may annotate the image frames to identify object categories for the video data. The classification system may utilize an object detection model to identify objects in the image frames based on the object categories, and may process the objects, with a multi-object tracking model, to determine object trajectories for the objects. The classification system may utilize planar homography to transform the object trajectories to overhead planar trajectories, and may process the overhead planar trajectories, with a noise reduction model, to generate simplified object trajectories. The classification system may convert a continuous space associated with the simplified object trajectories into a discrete space, and may utilize a Hilbert curve with the discrete space to convert the discrete space to a lower dimensional space. The classification system may utilize the lower dimensional space and the discrete space to transform the object trajectories to binary feature vectors, and may process the binary feature vectors, with a clustering model, to determine trajectory clusters. The classification system may train a classification model, with the binary feature vectors and the trajectory clusters, to generate a trained classification model, and may perform one or more actions based on the trained classification model.

In this way, the classification system utilizes machine learning models to classify vehicle trajectories and collect road use data in real-time. The classification system may collect, at a trajectory path level, more detailed and real-time road use data, such as anomalous driving behavior, traffic volume, average speed, vehicle idle time, and/or the like. The classification system may automatically define accurate object pathways based on historical object trajectories, and may classify trajectories in real-time into respective pathway clusters. A pathway cluster is a grouping of trajectories distinguished by characteristics, such as locations in space through time, speed, and/or the like. The classification system may be robust to noisy data and may provide a computationally-efficient trajectory classification, which enables collection of real-time data. This, in turn, conserves computing resources, networking resources, and/or the like that would otherwise have been consumed in failing to calculate trajectory paths of vehicles in real-time, generating incomplete or incorrect trajectory paths of vehicles, utilizing the incomplete or incorrect trajectory paths of vehicles to incorrectly manage a roadway (e.g., which may cause traffic congestion, traffic accidents, and/or the like), and/or the like.

Although implementations are described in connection with vehicles and roadways, the implementations described herein may be utilized with any scenario where an object tracking data is available. For example, the implementations described herein may be utilized with tracking data, such as video data, light detection and ranging (LiDAR) data, thermal imaging data, aircraft automatic dependent surveillance-broadcast (ADS-B) transponder data, vessel automatic identification system (AIS) tracking data, global positioning system (GPS) data, radio direction finder (RDF) receiver data, GPS tags data, imagery data, and/or the like associated with vehicle movements, pedestrian and cyclist movements, animal migration tracking, and/or the like.

FIGS. 1A-1L are diagrams of an example 100 associated with utilizing machine learning models to classify vehicle trajectories and collect road use data in real-time. As shown in FIGS. 1A-1L, example 100 includes a video camera associated with a classification system. The classification system may include a system that utilizes machine learning models to classify vehicle trajectories and collect road use data in real-time. Further details of the video camera and the classification system are provided elsewhere herein. Although the figures depict a single video camera, in some implementations, multiple video cameras may be associated with the classification system and may be deployed at various locations.

As shown in FIG. 1A, and by reference number 105, the classification system may receive video data identifying vehicles traveling on roadways. For example, the video camera may capture image frames and audio (e.g., the video data) of vehicles traveling roadways at a geographic location in real-time, and may store the video data in a data structure (e.g., a database, a table, a list, and/or the like) associated with the video camera. In some implementations, the video camera may provide the video data to the classification system in real-time rather than or in addition to storing the video data in the data structure. The classification system may receive the video data, identifying the vehicles traveling on the roadways, from the video camera.

In some implementations, the classification system may continuously receive the video data from the video camera, may periodically receive the video data from the video camera, may receive the video data from the video camera based on providing a request for the video data to the video camera, and/or the like. In some implementations, the classification system may store the video data in a data structure associated with the classification system.

As further shown in FIG. 1A, and by reference number 110, the classification system may extract image frames from the video data. For example, the video data may include image frames and audio, and the classification system may extract the image frames from the video data. The video data may include twenty-four, thirty, sixty, and/or the like image frames per second. A long length video may include thousands, hundreds of thousands, and/or the like of image frames. The classification system may utilize a video frame extractor (e.g., a Video to Picture, a VLC Media Player, a Video to JPG Converter, and/or the like) to split the video data into the image frames.

Figure 1B:
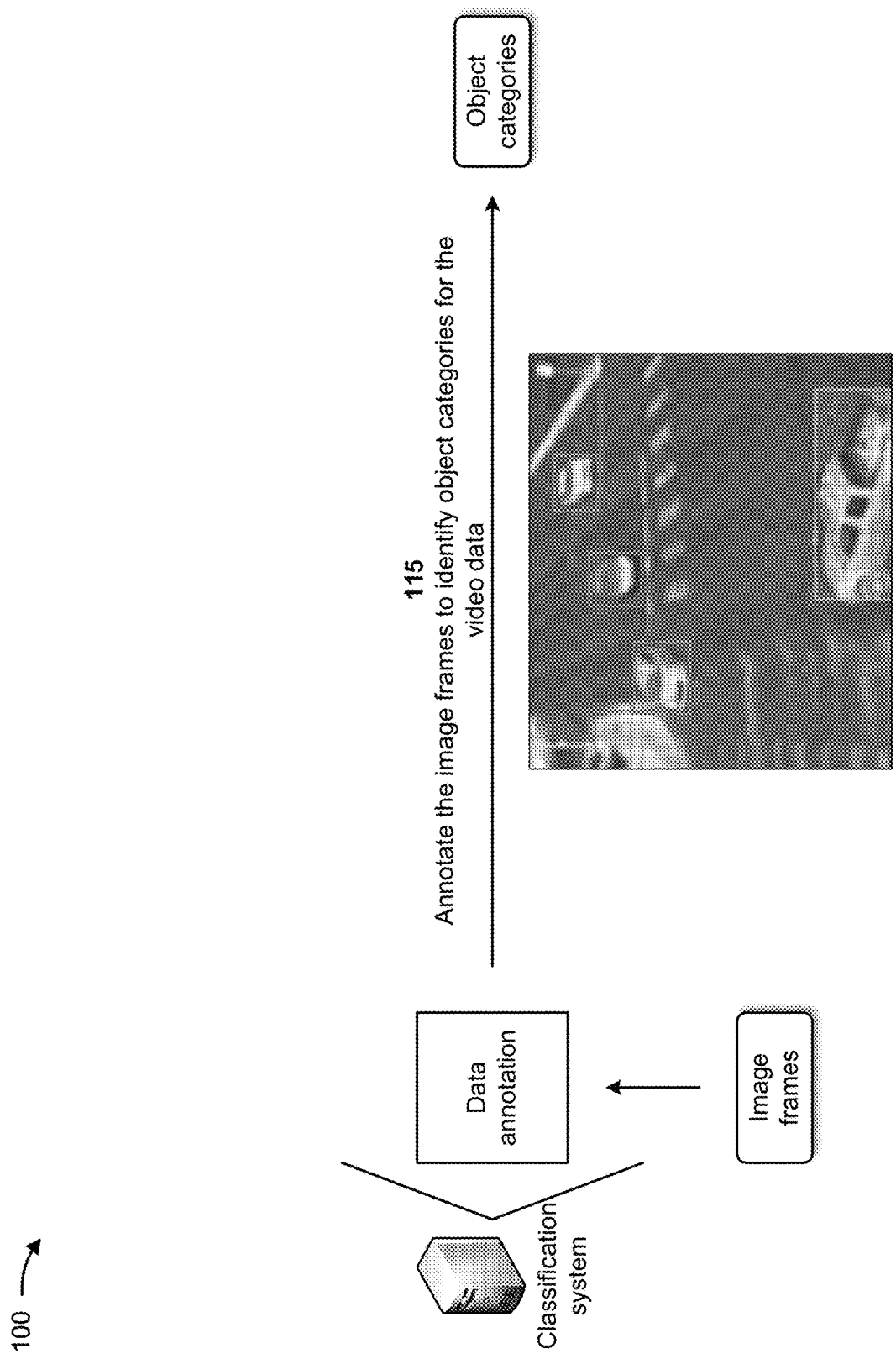

As shown in FIG. 1B, and by reference number 115, the classification system may annotate the image frames to identify object categories for the video data. For example, the classification system may annotate the image frames to provide bounding boxes around objects (e.g., vehicles) in the image frames, identify object categories (e.g., classes) for the image frames, assign scores to the object categories (e.g., indicating a likelihood of objects being within the object categories), and/or the like. In some implementations, the object categories may include cars (e.g., small to mid-size cars, such as compacts, sedans, sport utility vehicles, hatchbacks, and/or the like), trucks (e.g., all sizes of trucks, emergency vehicles, and other large commercial vehicles), buses (e.g., public transport vehicles and school buses), motorcycles, mopeds, and/or the like.

Figure 1C:
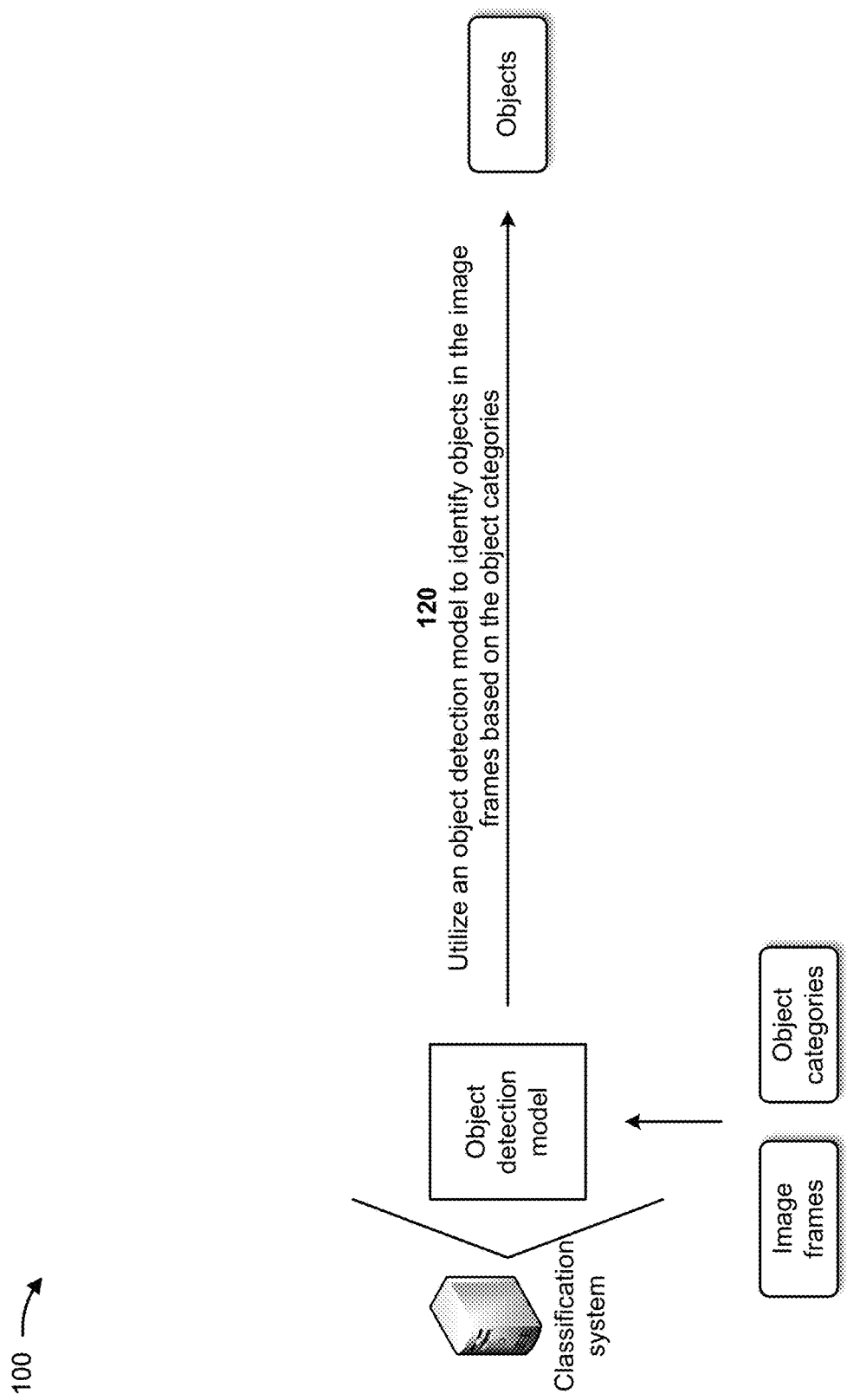

As shown in FIG. 1C, and by reference number 120, the classification system may utilize an object detection model to identify objects in the image frames based on the object categories. For example, the classification system may process the image frames and the object categories, with an object detection model, to identify objects in the image frames. In some implementations, the object detection model may include a single-stage object detection network model, such as a you-only-look-once (YOLO) version 5 model. A YOLO model may detect and recognize various objects in an image frame in real-time. Object detection with the YOLO model is performed as a regression problem and provides class probabilities of the detected objects. The YOLO model employs a convolutional neural network (CNN) to detect the objects in real-time. As the name suggests, the YOLO model requires only a single forward propagation through a neural network to detect objects. This means that prediction in an entire image frame is performed in a single execution of the YOLO model. The CNN may be used to predict various class probabilities and bounding boxes simultaneously. In some implementations, the object detection model may identify the objects in the image frames as cars, trucks, buses, motorcycles, mopeds, and/or the like.

Figure 1D:
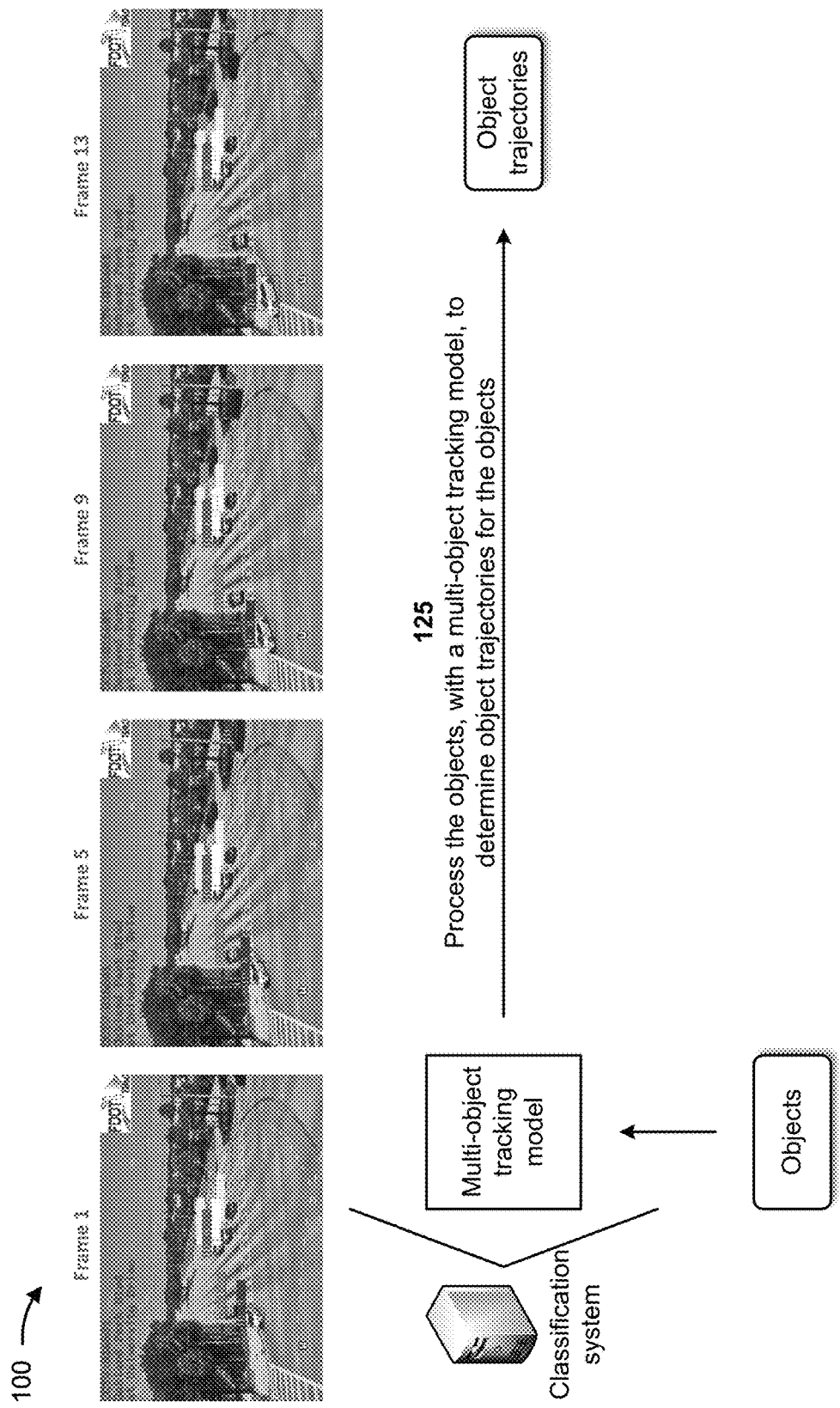

As shown in FIG. 1D, and by reference number 125, the classification system may process the objects, with a multi-object tracking model, to determine object trajectories for the objects. For example, the classification system may utilize a deep simple real-time tracking model (e.g., a deep simple online real-time tracking (SORT) model) to process the objects and to determine the object trajectories for the objects. The deep SORT model may track multiple objects in the image frames (e.g., the objects identified by the YOLO model) and may perform a matching for similar detections of the objects with respect to previous frame detections of the objects. The deep SORT model may match or associate an object from image frame to image frame via a motion association, an appearance association, and/or the like. In some implementations, occlusions occur regularly in traffic camera scenarios and current techniques fail to address occlusion issues. In contrast, the deep SORT model may handle the occlusion issues when determining the object trajectories for the objects. In some implementations, the deep SORT model may process every third, fourth, fifth, and/or image frame to keep the processing in real-time and without a meaningful loss of tracking performance.

Figure 1E:
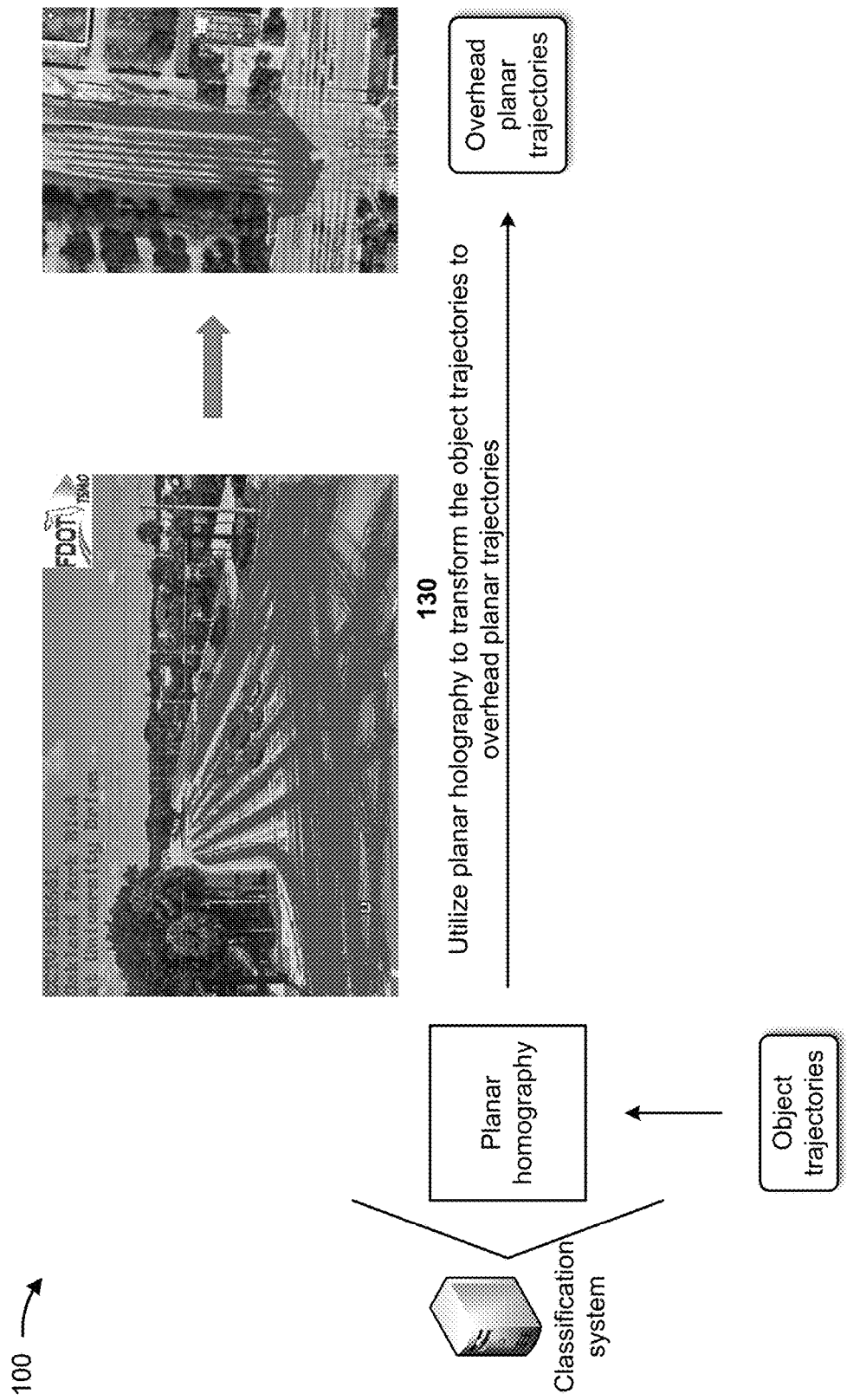

As shown in FIG. 1E, and by reference number 130, the classification system may utilize planar homography to transform the object trajectories to overhead planar trajectories. For example, for each unique vehicle identified, using the multi-object tracking model, a trajectory is recorded. A trajectory may be represented as a series of x and y coordinates (e.g., $[[x_0, y_0], [x_1, y_1], \ldots, [x_n, y_n]]$). Planar homography may include deriving a linear relationship between coordinates of points on an arbitrary plane in a scene and a coordinate of a point in an image. The classification system may utilize planar homography to transform a trajectory (e.g., $[[x_0, y_0], [x_1, y_1], \ldots, [x_n, y_n]]$) to another plane (e.g., an overhead plane view, $$H\begin{bmatrix} x_0 \\ y_0 \\ 1 \end{bmatrix} = \begin{bmatrix} x_0 \\ y_0 \\ 1 \end{bmatrix}).$$

Utilizing planar homography to transform the object trajectories to the overhead planar trajectories may make distances between points comparable (e.g., with a threshold distance range).

As shown in FIG. 1F, and by reference number 135, the classification system may process the overhead planar trajectories, with a noise reduction model, to generate simplified object trajectories. For example, the classification system may utilize the noise reduction model to remove noise from the overhead planar trajectories and to generate the simplified object trajectories. The noise reduction model may simplify a trajectory into a minimum quantity of points required for representing the trajectory for a classification model. The classification system may iteratively execute the following steps of the noise reduction model on successive points of a trajectory. The noise reduction model may calculate degrees between a current point of one of the overhead planar trajectories and a predetermined quantity of next points of the one of the overhead planar trajectories, and may calculate modified z-scores for the degrees according to the following:

$$\text{modified } z \text{ score} = 0.6745 \times \frac{(a_i - \text{median}(a))}{(\text{median}(\text{abs}(a_i - \text{median}(a))))}$$

where a corresponds to the degrees between a current point (i) of one of the overhead planar trajectories and a predetermined quantity of next points of the one of the overhead planar trajectories. The noise reduction model may remove points from the one of the overhead planar trajectories associated with one or more of the modified z-scores that are greater than a threshold score. The aforementioned steps may be repeated until no more points can be removed from the trajectory. In one example, five points (e.g., $v_1, v_2, v_3, v_4$, and $v_5$) of a trajectory may be processed by the noise reduction model. The degrees between the first point and the second point may be a=degrees between $(v_1, v_2)$=315°; the degrees between the first point and the third point may be b=degrees between $(v_1, v_3)$=293°; the degrees between the first point and the fourth point may be c=degrees between $(v_1, v_4)$=326°; and the degrees between the first point and the fifth point may be d=degrees between $(v_1, v_5)$=323°. In such an example, the noise reduction model may determine that the third point $v_3$ is an outlier due to the considerable angle difference from the other points along the trajectory, and may remove the third point $v_3$ from the trajectory (e.g., abs(modified z scores(a, b, c, d))>threshold=False, True, False, False.

Figure 1G:
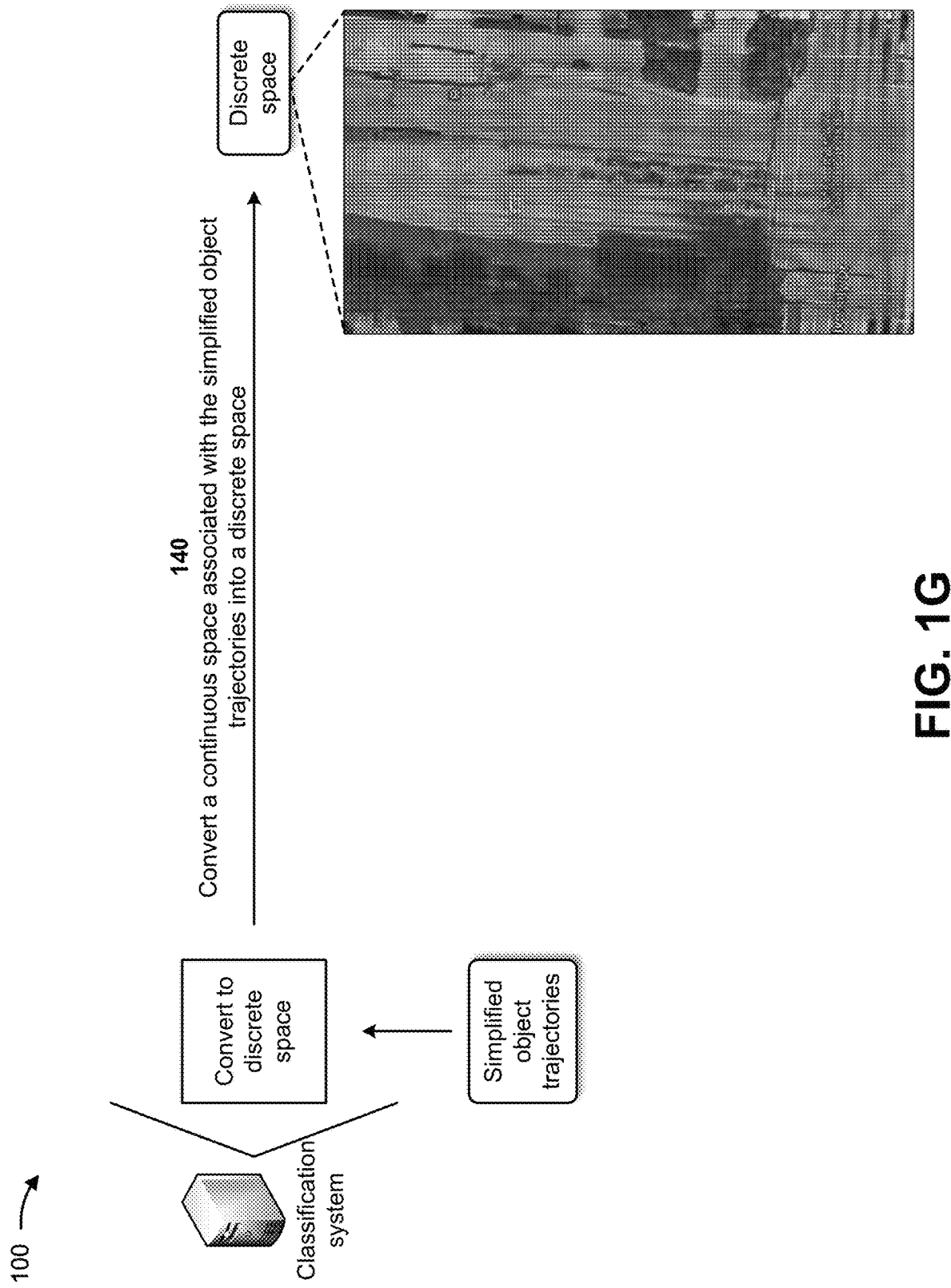

As shown in FIG. 1G, and by reference number 140, the classification system may convert a continuous space associated with the simplified object trajectories into a discrete space. For example, machine learning models, based on calculating similarity measures, typically expect as input a fixed quantity of features (e.g., an instance has a value for each of n features, $[x_0, x_1, \ldots, x_n]$). Distance measures in this scenario may have an execution complexity of O(n), which means that for each feature, a single operation occurs when calculating the distance. Trajectories may be represented by a multidimensional series as a function of time (e.g., a sequence of coordinates occupied by an object as the object travels). It is also possible to have angle of travel, speed, and other metrics recorded at each step in the multidimensional series (e.g., $[[x_0, x_1, \ldots, x_n], [x_0, x_1, \ldots, x_n], \ldots, [x_0, x_1, \ldots, x_n]]$). It is extremely uncommon for trajectories to have the same length, and, for this reason, trajectories are rarely directly comparable. Distance measures exist that are specifically designed for this scenario. However, for such distance measures execution complexities are worse (e.g., O(mn)).

When calculating a distance between two multidimensional trajectory series, the computation time exponentially increases as a quantity of points in the series increases. In contrast, the classification system may have a consistent runtime regardless of the quantity of points in the trajectory due to the transformation of the trajectory into a set number of binary features (e.g., a discrete space). Typically, prior to calculating a distance between trajectories, trajectory simplification models, such as the Ramer-Douglas-Peucker model, are used to reduce the quantity of points. This reduces a trajectory series into fewer points, which will result in a distance calculation that is not as costly. However, such trajectory simplification models result in a less representative feature representation, which leads to a clustering model performing poorer in identifying cluster pathways.

The classification system solves these issues by transforming trajectories into a lower dimensional representation that has a set quantity of features. The classification system may define a discrete space, which retains spatial locality well, for all combinations of coordinate feature vectors, and may utilize the discrete space to transform each coordinate feature vector in a sequence into a single value (e.g., a binary value) when a coordinate combination exists in the trajectory (e.g., $[[x_0, x_1, \ldots, x_n], [x_0, x_1, \ldots, x_n], \ldots, [x_0, x_1, \ldots, x_n]] \rightarrow [x_0, x_1, \ldots, x_n]$). This binary value provides a computationally-efficient calculation of distances. The classification system may transform sequences of (x, y) coordinates into a lower dimensional representation, and apply the methodology even if additional data is present, such as speed. The classification system may utilize space-filling curves to reduce a series of (x, y) coordinates into a binary feature vector. Utilizing a space-filling curve (e.g., a Hilbert curve), the classification system may map between a multidimensional space and one-dimensional space that preserves locality well (e.g., since any two data points which are close in a multidimensional space will also be close in a one-dimensional space).

The classification system may convert a continuous space associated with the simplified object trajectories into a discrete space. The classification system may select a minimum value and a maximum value for each feature in a multidimensional space (e.g., the continuous space associated with the simplified object trajectories), and, for each feature in the multidimensional space, may select a step size. The classification system may convert the continuous space into the discrete space (e.g., a grid) based on the minimum value, the maximum value, and the step size.

Figure 1H:
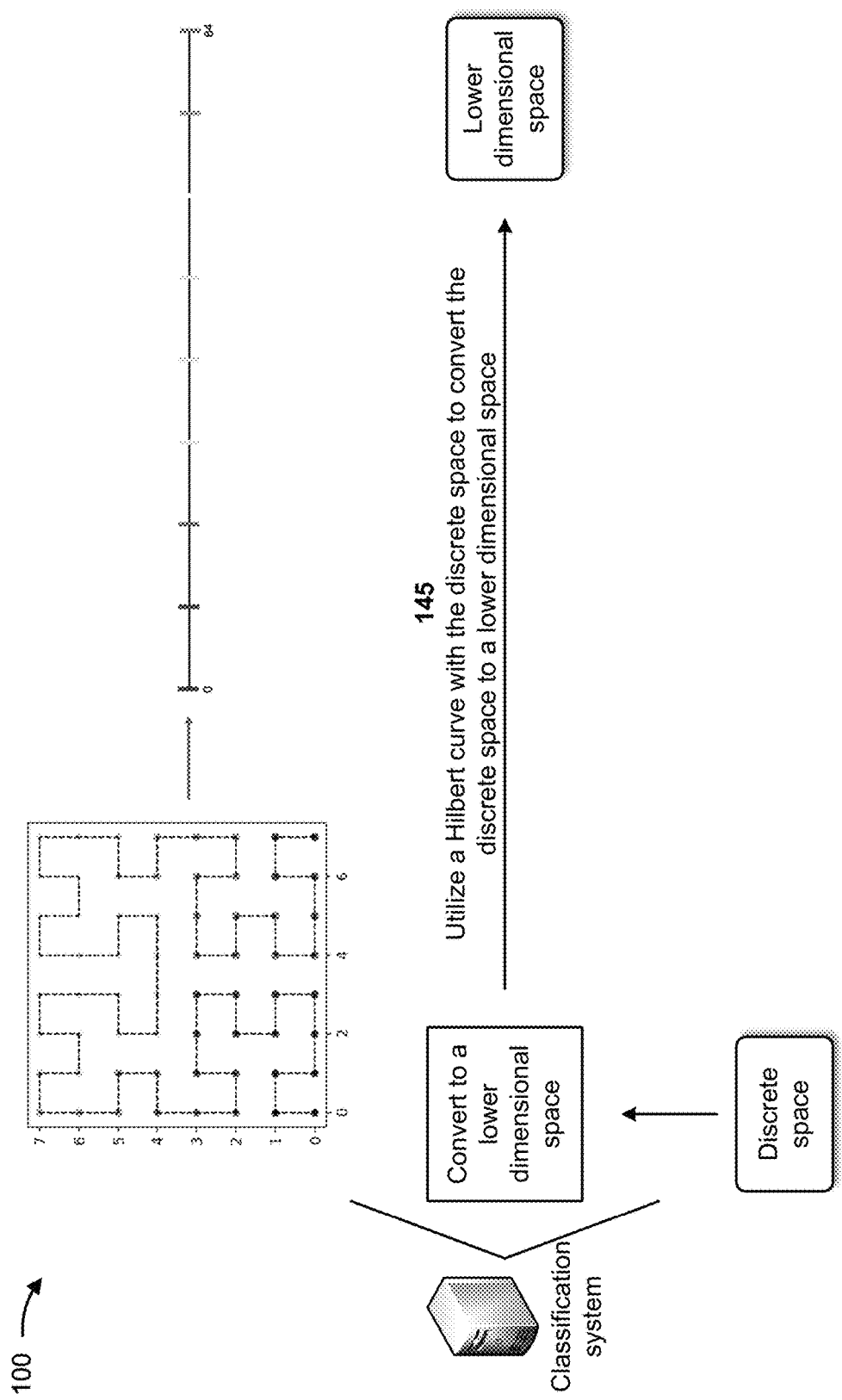

As shown in FIG. 1H, and by reference number 145, the classification system may utilize a Hilbert curve with the discrete space to convert the discrete space to a lower dimensional space. For example, the Hilbert curve is a space-filling curve that visits each and every point in the discrete space (e.g., grid). The classification system may utilize the Hilbert curve with the discrete space to associate a value with each point (e.g., each grid cell) in the discrete space, and may convert the discrete space to the lower dimensional space (e.g., from a two-dimensional space to a one-dimensional space) based on utilizing the Hilbert curve with the discrete space to associate the value with each point in the discrete space.

Figure 1I:
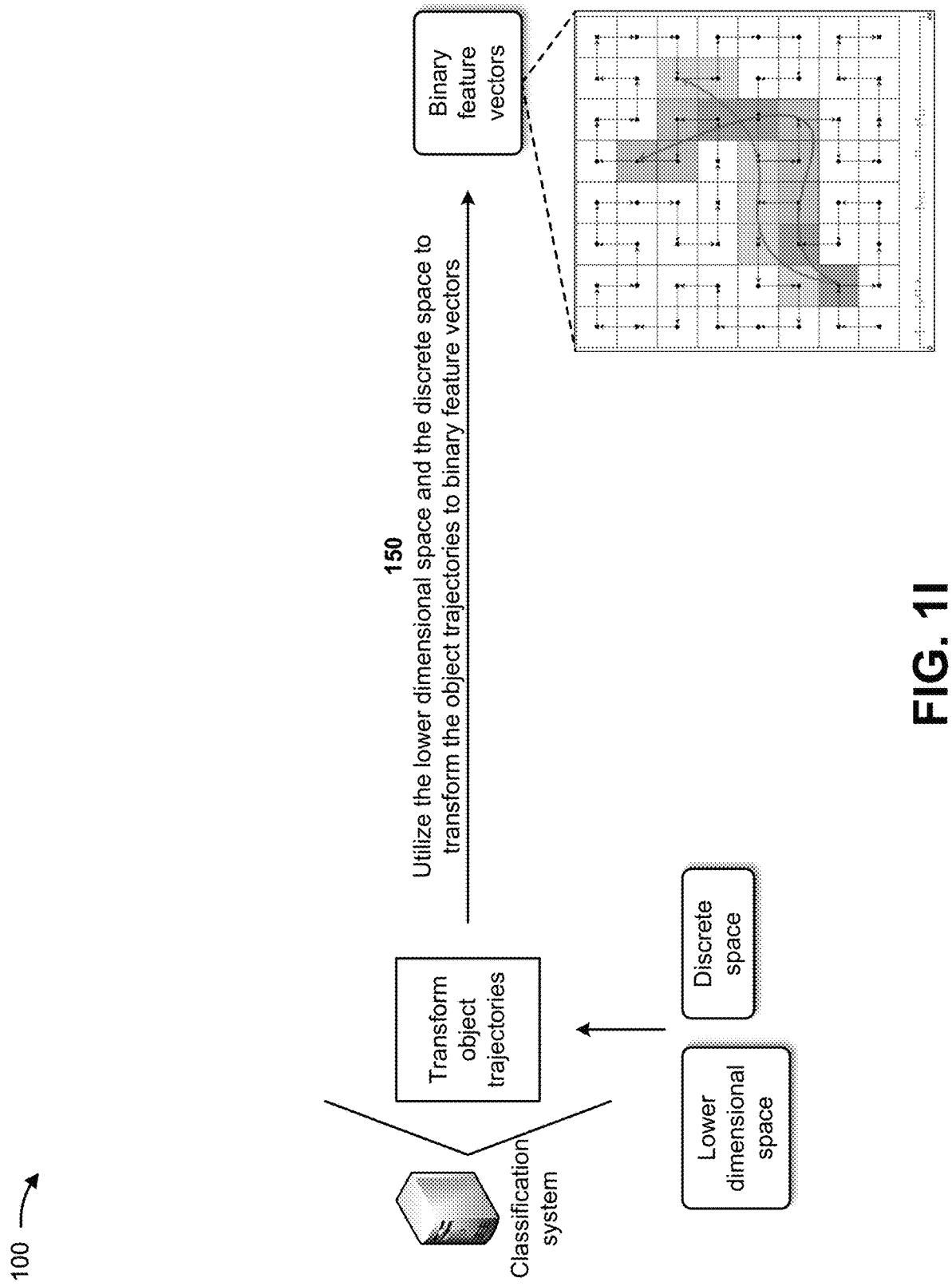

As shown in FIG. 1I, and by reference number 150, the classification system may utilize the lower dimensional space and the discrete space to transform the object trajectories to binary feature vectors. For example, the classification system may transform each object trajectory into a binary feature vector based on the lower dimensional space and the discrete space. In some implementations, based on the discrete space (e.g., the grid cells) through which a trajectory is traversed, the classification system may assign a value of one (1) to respective points along the lower dimensional space (e.g., a one-dimensional Hilbert curve). Transforming the object trajectories into the binary feature vectors may enable more efficient distance measures to be used when calculating similarities between trajectories.

As shown in FIG. 1J, and by reference number 155, the classification system may process the binary feature vectors, with a clustering model, to determine trajectory clusters. For example, the classification system may utilize a clustering model (e.g., a hierarchical density-based spatial clustering of applications with noise (HDBScan clustering model) to identify trajectory clusters. This HDBScan clustering model may not require selection of a predetermined quantity of clusters, which may be useful for trajectory clustering since how many trajectories are present is typically unknown. The HDBScan clustering model may enable variation of cluster densities where less-traveled trajectories are still identified. The HDBScan clustering model may automatically determine the trajectory clusters for a roadway without a need for manual input, and may collect trajectory level statistics on how the roadway is being utilized (e.g., a volume of vehicles, average speeds of vehicles, idle times of vehicles, and/or the like).

Figure 1K:
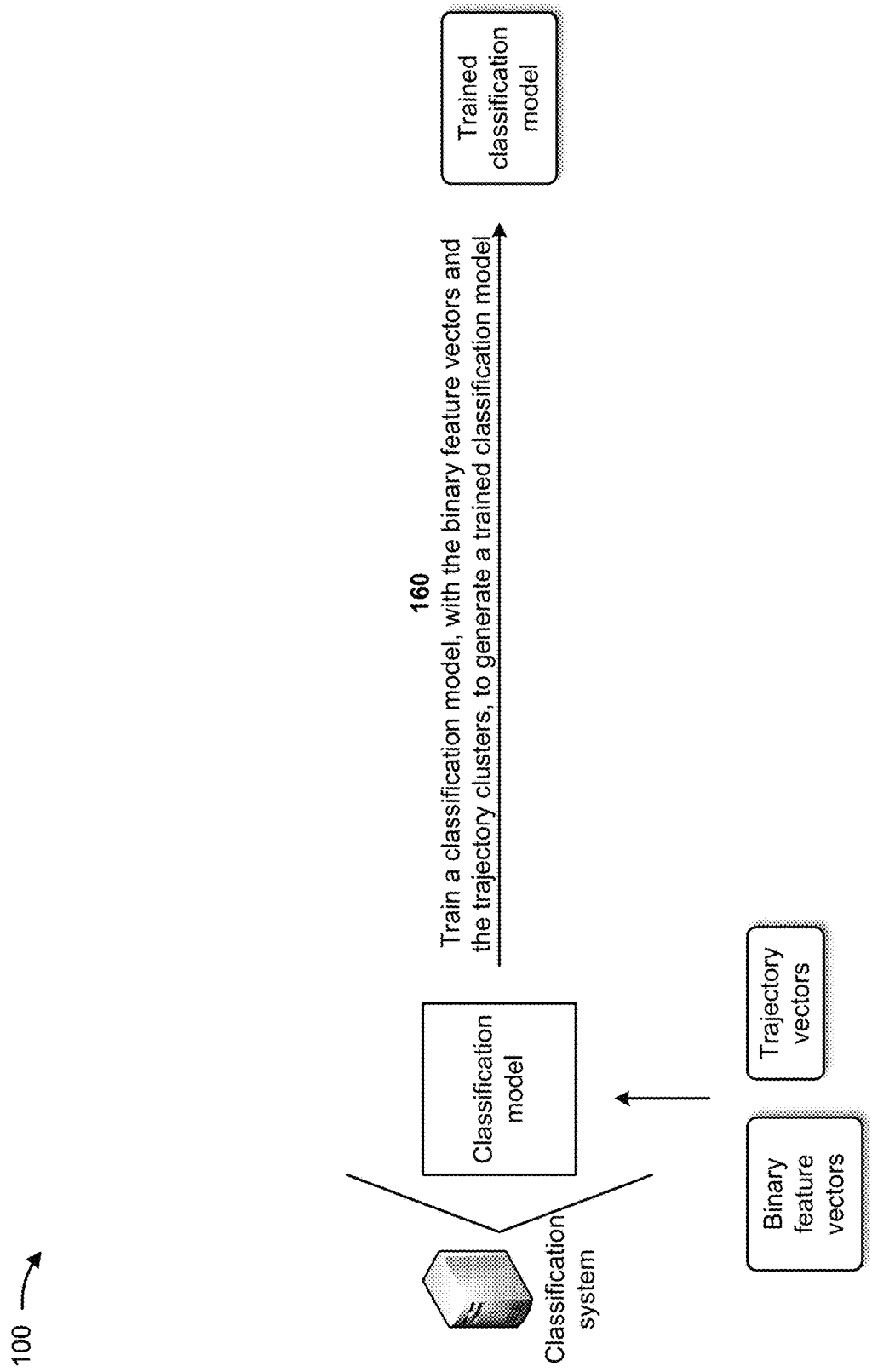

As shown in FIG. 1K, and by reference number 160, the classification system may train a classification model, with the binary feature vectors and the trajectory clusters, to generate a trained classification model. For example, the classification system may train a classification model, such as an XGBoost model, with the binary feature vectors and the trajectory clusters, to generate the trained classification model. The trained classification model may be deployed to predict real-time pathways for new trajectories. The classification model may be trained using the binary feature representations (e.g., the binary feature vectors) and the cluster labels (e.g., the trajectory clusters). Such an approach to training a classification model is not possible with original trajectory representations due to incomparability of sequence features. Furthermore, current clustering techniques fail to identify the cluster trajectories pathways as well as the classification system (e.g., which represents a trajectory with more points and with representations that are directly comparable on a feature-by-feature basis).

Figure 1L:
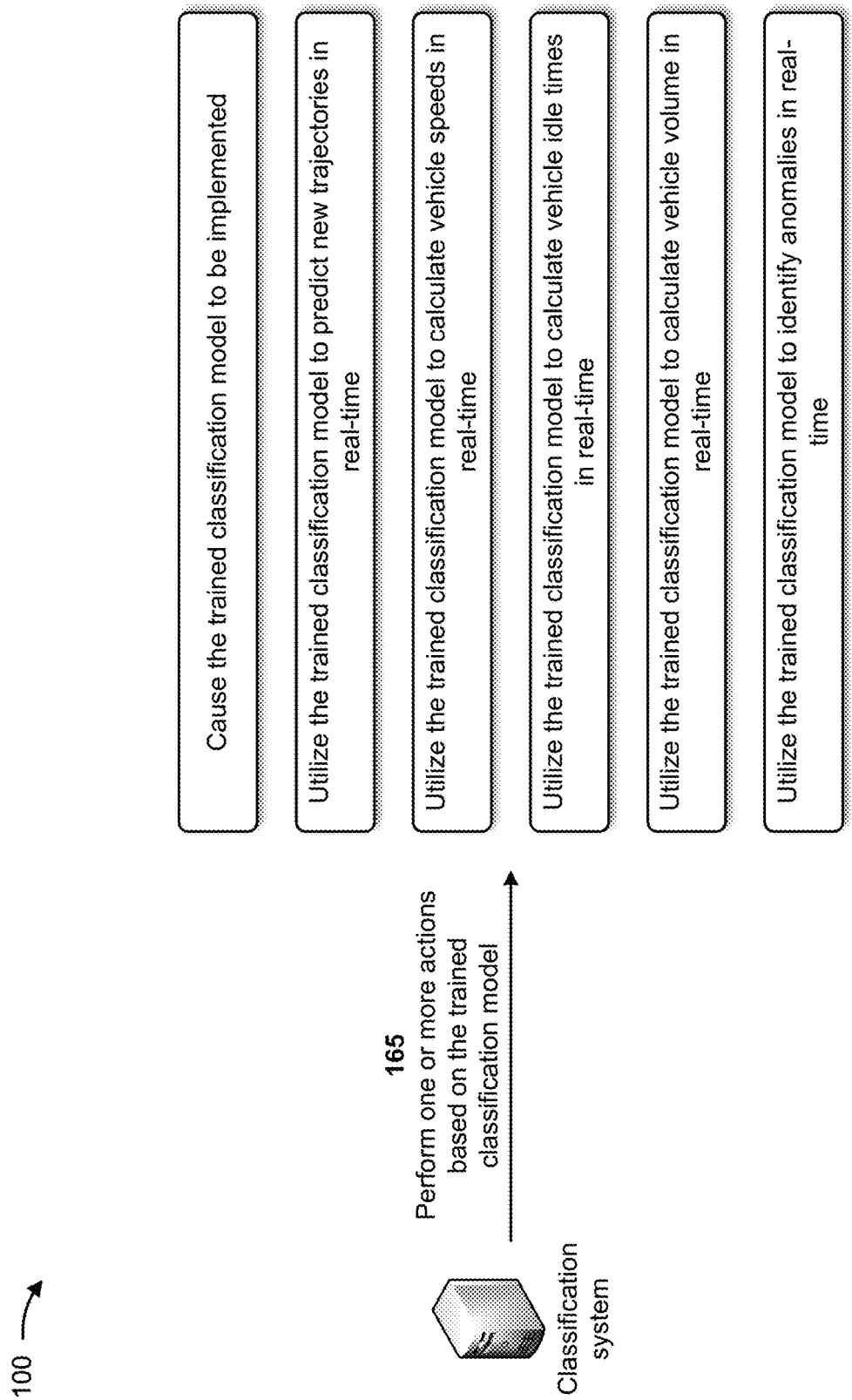

As shown in FIG. 1L, and by reference number 165, the classification system may perform one or more actions based on the trained classification model. In some implementations, performing the one or more actions includes the classification system causing the trained classification model to be implemented. For example, the classification system may provide the trained classification model to the video camera or a system controlling the video camera, and the video camera or the system may implement the trained classification model to predict real-time pathways for new trajectories. In this way, the classification system conserves computing resources, networking resources, and/or the like that would otherwise have been consumed in failing to calculate trajectory paths of vehicles in real-time.

In some implementations, performing the one or more actions includes the classification system utilizing the trained classification model to predict new trajectories in real-time. For example, the classification system may receive real-time video data from the video camera, and may process the real-time video data with the trained classification model to predict new trajectories in real-time. The classification system may utilize the predicted trajectories to cause modifications to the roadways, signaling at the roadways, and/or the like. In this way, the classification system conserves computing resources, networking resources, and/or the like that would otherwise have been consumed in generating incomplete or incorrect trajectory paths of vehicles.

In some implementations, performing the one or more actions includes the classification system utilizing the trained classification model to calculate vehicle speeds in real-time. For example, the classification system may receive real-time video data from the video camera, and may process the real-time video data with the trained classification model to calculate vehicle speeds in real-time. The classification system may utilize the vehicle speeds to cause modifications to the roadways, to generate traffic citations, and/or the like. In this way, the classification system conserves computing resources, networking resources, and/or the like that would otherwise have been consumed in utilizing the incomplete or incorrect trajectory paths of vehicles to incorrectly manage a roadway (e.g., which may cause traffic congestion, traffic accidents, and/or the like).

In some implementations, performing the one or more actions includes the classification system utilizing the trained classification model to calculate vehicle idle times in real-time. For example, the classification system may receive real-time video data from the video camera, and may process the real-time video data with the trained classification model to calculate vehicle idle times in real-time. The classification system may utilize the vehicle idle times to cause modifications to the roadways, to adjust traffic signals, and/or the like. In this way, the classification system conserves computing resources, networking resources, and/or the like that would otherwise have been consumed in utilizing the incomplete or incorrect trajectory paths of vehicles to incorrectly manage a roadway (e.g., which may cause traffic congestion, traffic accidents, and/or the like).

In some implementations, performing the one or more actions includes the classification system utilizing the trained classification model to calculate vehicle volume in real-time. For example, the classification system may receive real-time video data from the video camera, and may process the real-time video data with the trained classification model to calculate vehicle volume in real-time. The classification system may utilize the vehicle volume to cause modifications to the roadways, to schedule adding additional lanes to the roadways, to adjust traffic signals, and/or the like. In this way, the classification system conserves computing resources, networking resources, and/or the like that would otherwise have been consumed in utilizing the incomplete or incorrect trajectory paths of vehicles to incorrectly manage a roadway (e.g., which may cause traffic congestion, traffic accidents, and/or the like).

In some implementations, performing the one or more actions includes the classification system utilizing the trained classification model to identify anomalies in real-time. For example, the classification system may receive real-time video data from the video camera, and may process the real-time video data with the trained classification model to identify anomalies in real-time. The classification system may utilize the vehicle volume to cause modifications to the roadways, to investigate the anomalies, to adjust traffic signals, and/or the like. In this way, the classification system conserves computing resources, networking resources, and/or the like that would otherwise have been consumed in utilizing the incomplete or incorrect trajectory paths of vehicles to incorrectly manage a roadway (e.g., which may cause traffic congestion, traffic accidents, and/or the like).

In this way, the classification system utilizes machine learning models to classify vehicle trajectories and collect road use data in real-time. The classification system may collect, at a trajectory path level, real-time road use data, such as anomalous driving behavior, traffic volume, average speed, vehicle idle time, and/or the like. The classification system may automatically define accurate object pathways based on historical object trajectories, and may classify trajectories in real-time into respective pathway clusters. A pathway cluster is a grouping of trajectories distinguished by characteristics, such as locations in space through time, speed, and/or the like. The classification system may be robust to noisy data and may provide a computationally-efficient trajectory classification, which enables collection of real-time data. This, in turn, conserves computing resources, networking resources, and/or the like that would otherwise have been consumed in failing to calculate trajectory paths of vehicles in real-time, generating incomplete or incorrect trajectory paths of vehicles, utilizing the incomplete or incorrect trajectory paths of vehicles to incorrectly manage a roadway (e.g., which may cause traffic congestion, traffic accidents, and/or the like), and/or the like.

As indicated above, FIGS. 1A-1L are provided as an example. Other examples may differ from what is described with regard to FIGS. 1A-1L. The number and arrangement of devices shown in FIGS. 1A-1L are provided as an example. In practice, there may be additional devices, fewer devices, different devices, or differently arranged devices than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
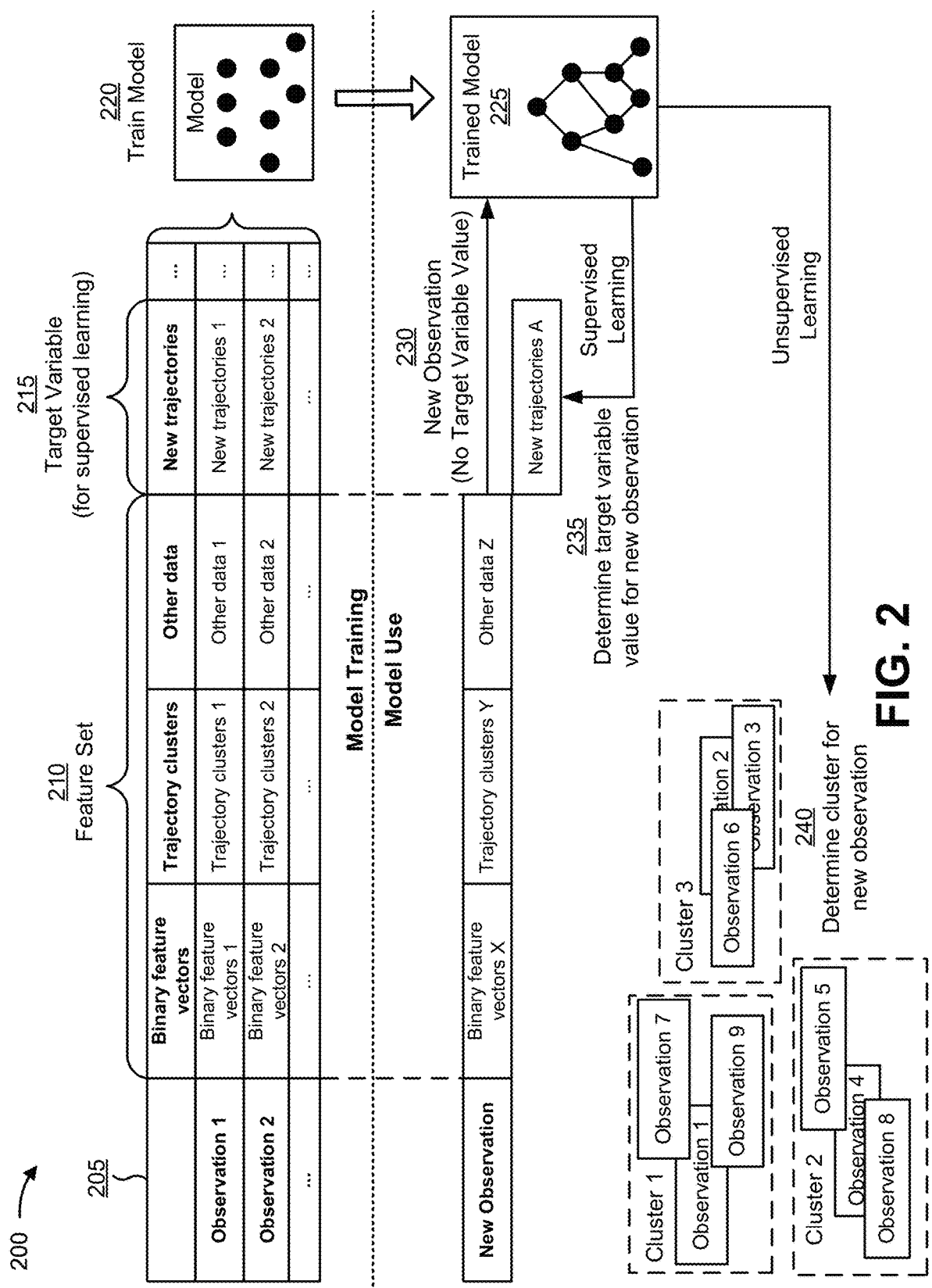
FIG. 2 is a diagram illustrating an example of training and using a machine learning model.

FIG. 2 is a diagram illustrating an example 200 of training and using a machine learning model for classifying vehicle trajectories and collecting road use data in real-time. The machine learning model training and usage described herein may be performed using a machine learning system. The machine learning system may include or may be included in a computing device, a server, a cloud computing environment, and/or the like, such as the classification system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the classification system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the classification system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of binary feature vectors, a second feature of trajectory clusters, a third feature of other data, and so on. As shown, for a first observation, the first feature may have a value of binary feature vectors 1, the second feature may have a value of trajectory clusters 1, the third feature may have a value of other data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be new trajectories and may include a value of new trajectories 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of binary feature vectors X, a second feature of trajectory clusters Y, a third feature of other data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of new trajectories A for the target variable of the new trajectories for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a binary feature vectors cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., another data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to classify vehicle trajectories and collect road use data in real-time. The machine learning system enables recognition and/or identification of tens, hundreds, thousands, or millions of features and/or feature values for tens, hundreds, thousands, or millions of observations, thereby increasing accuracy and consistency and reducing delay associated with classifying vehicle trajectories and collecting road use data in real-time relative to requiring computing resources to be allocated for tens, hundreds, or thousands of operators to manually classify vehicle trajectories and collect road use data in real-time.

As indicated above, FIG. 2 is provided as an example. Other examples may differ from what is described in connection with FIG. 2.

Figure 3:
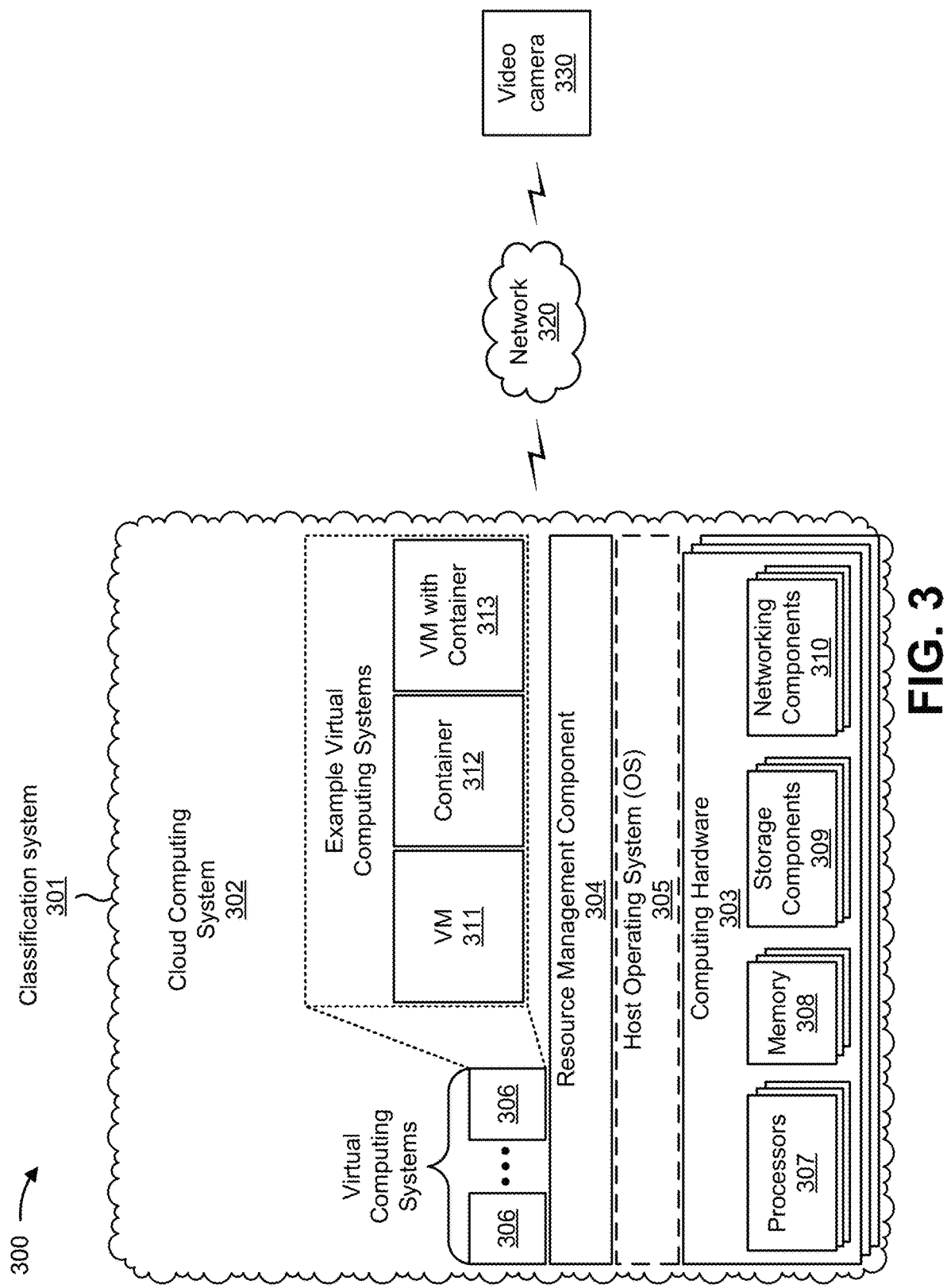
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a classification system 301, which may include one or more elements of and/or may execute within a cloud computing system 302. The cloud computing system 302 may include one or more elements 303-313, as described in more detail below. As further shown in FIG. 3, the environment 300 may include a network 320 and/or a video camera 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the classification system 301 may include one or more elements 303-313 of the cloud computing system 302, may execute within the cloud computing system 302, and/or may be hosted within the cloud computing system 302, in some implementations, the classification system 301 may not be cloud-based (e.g., may be implemented outside of a cloud computing system) or may be partially cloud-based. For example, the classification system 301 may include one or more devices that are not part of the cloud computing system 302, such as device 400 of FIG. 4, which may include a standalone server or another type of computing device. The classification system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The video camera 330 may include one or more devices capable of receiving, generating, storing, processing, providing, and/or routing information, as described elsewhere herein. The video camera 330 may include a communication device and/or a computing device. For example, the video camera 330 may include an optical instrument that captures videos (e.g., images and audio). The video camera 330 may feed real-time video directly to a screen or a computing device for immediate observation, may record the captured video (e.g., images and audio) to a storage device for archiving or further processing, and/or the like. The recorded video may be utilized for surveillance and monitoring tasks in which unattended recording of a situation is required for later analysis.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
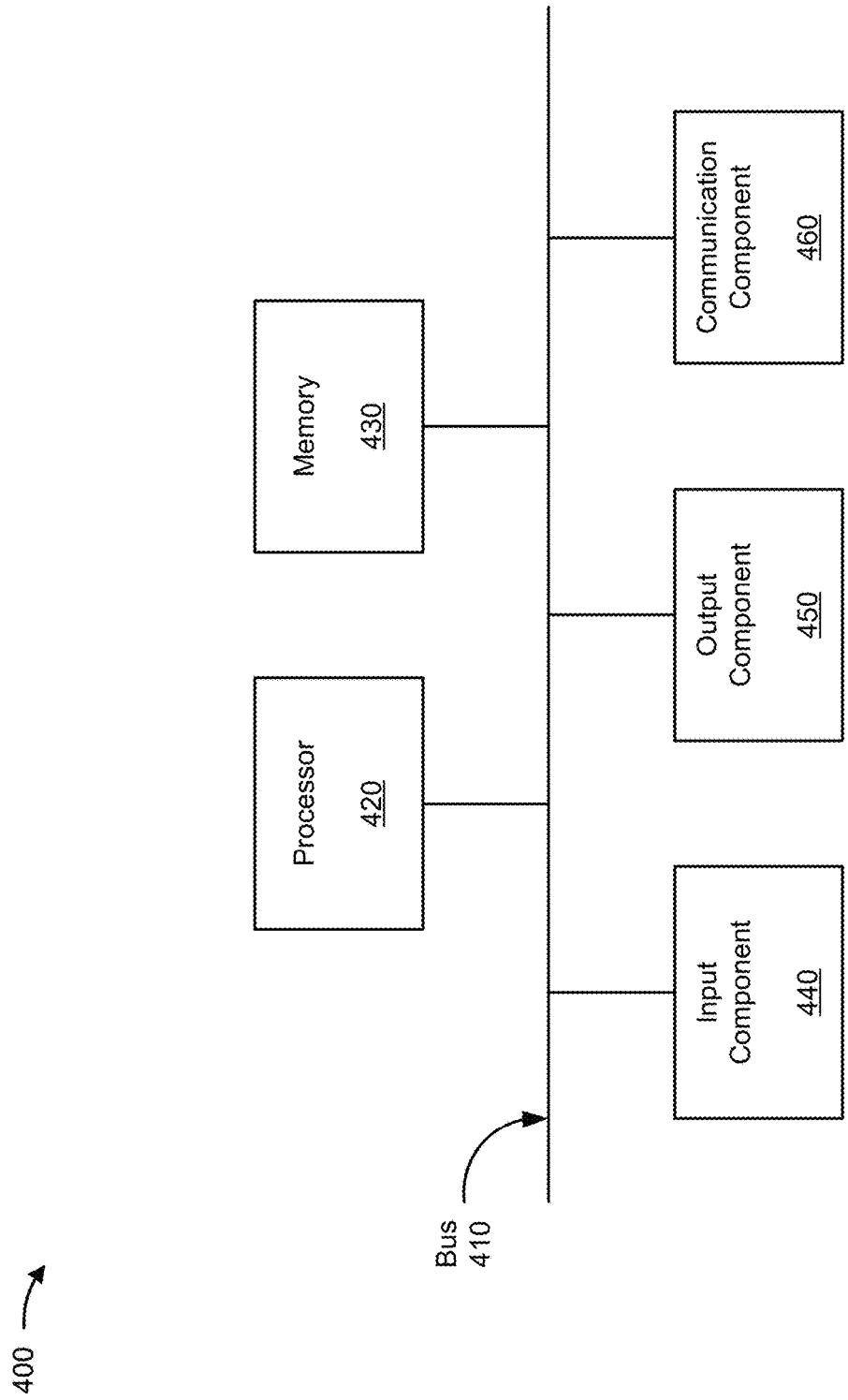
FIG. 4 is a diagram of example components of one or more devices of FIG. 3.

FIG. 4 is a diagram of example components of a device 400, which may correspond to the classification system 301 and/or the video camera 330. In some implementations, the classification system 301 and/or the video camera 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
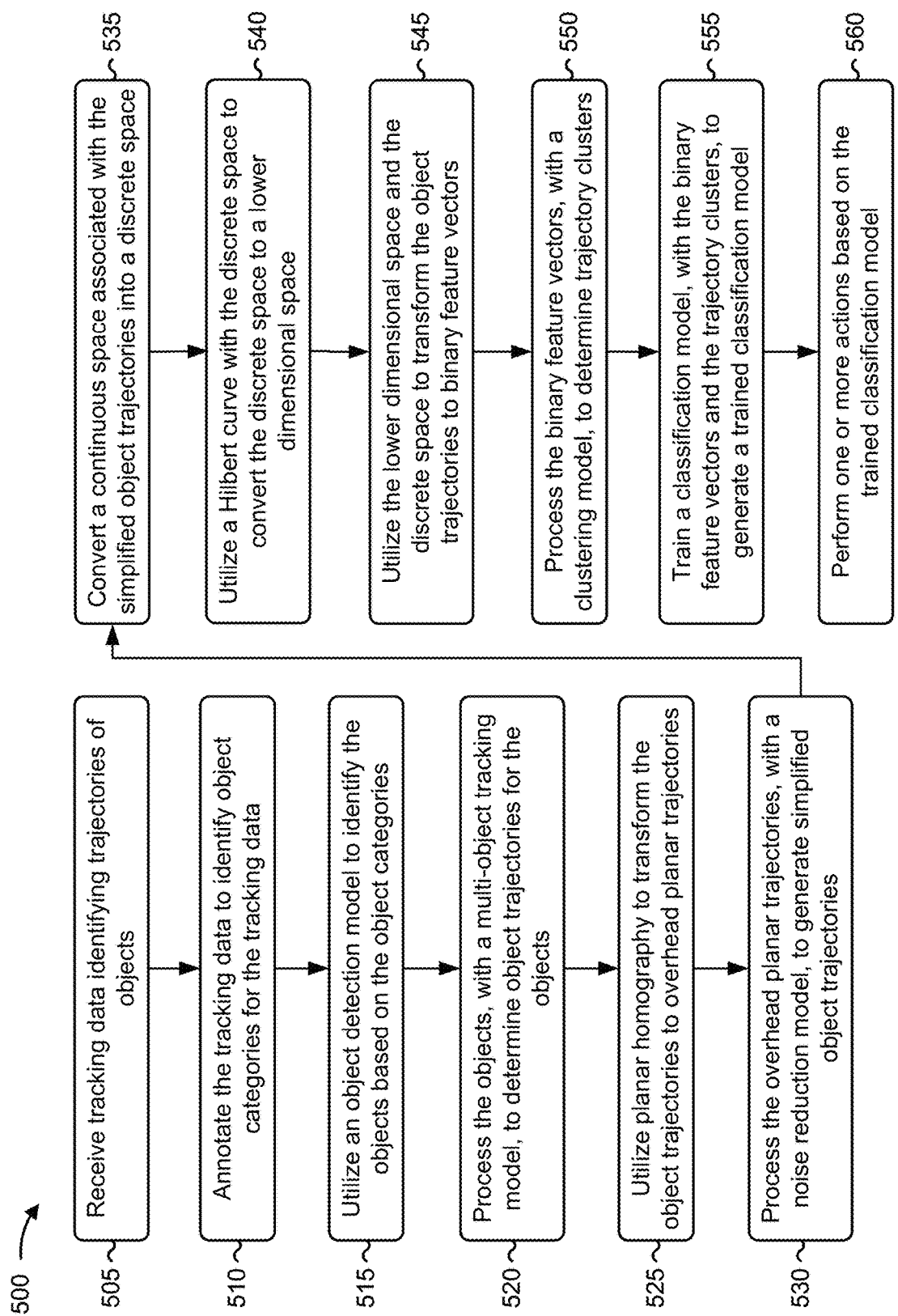
FIG. 5 is a flowchart of an example process for utilizing machine learning models to classify vehicle trajectories and collect road use data in real-time.

FIG. 5 is a flowchart of an example process 500 for utilizing machine learning models to classify vehicle trajectories and collect road use data in real-time. In some implementations, one or more process blocks of FIG. 5 may be performed by a device (e.g., the classification system 301). In some implementations, one or more process blocks of FIG. 5 may be performed by another device or a group of devices separate from or including the device, such as a video camera (e.g., the video camera 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving tracking data identifying trajectories of objects (block 505). For example, the device may receive tracking data identifying trajectories of objects, as described above. In some implementations, the tracking data includes video data.

As further shown in FIG. 5, process 500 may include annotating the tracking data to identify object categories for the tracking data (block 510). For example, the device may annotate the tracking data to identify object categories for the tracking data, as described above.

As further shown in FIG. 5, process 500 may include utilizing an object detection model to identify the objects based on the object categories (block 515). For example, the device may utilize an object detection model to identify the objects based on the object categories, as described above. In some implementations, utilizing the object detection model to identify the objects based on the object categories includes processing the object categories, with a single-stage object detection network model, to identify the objects.

As further shown in FIG. 5, process 500 may include processing the objects, with a multi-object tracking model, to determine object trajectories for the objects (block 520). For example, the device may process the objects, with a multi-object tracking model, to determine object trajectories for the objects, as described above. In some implementations, the multi-object tracking model is a deep simple real-time tracker model.

As further shown in FIG. 5, process 500 may include utilizing planar homography to transform the object trajectories to overhead planar trajectories (block 525). For example, the device may utilize planar homography to transform the object trajectories to overhead planar trajectories, as described above. In some implementations, the overhead planar trajectories make distances between points of the object trajectories comparable.

As further shown in FIG. 5, process 500 may include processing the overhead planar trajectories, with a noise reduction model, to generate simplified object trajectories (block 530). For example, the device may process the overhead planar trajectories, with a noise reduction model, to generate simplified object trajectories, as described above. In some implementations, processing the overhead planar trajectories, with the noise reduction model, to generate the simplified object trajectories includes calculating degrees between a current point of one of the overhead planar trajectories and a predetermined quantity of next points of the one of the overhead planar trajectories, calculating modified z-scores for the degrees, and removing points from the one of the overhead planar trajectories associated with one or more of the modified z-scores that are greater than a threshold score.

As further shown in FIG. 5, process 500 may include converting a continuous space associated with the simplified object trajectories into a discrete space (block 535). For example, the device may convert a continuous space associated with the simplified object trajectories into a discrete space, as described above. In some implementations, the discrete space retains spatial locality for combinations of coordinate feature vectors of the continuous space associated with the simplified object trajectories. In some implementations, converting the continuous space associated with the simplified object trajectories into the discrete space includes selecting a minimum value and a maximum value for each feature in the continuous space, selecting a step size for each feature in the continuous space, and converting the continuous space into the discrete space based on the minimum value, the maximum value, and the step size.

As further shown in FIG. 5, process 500 may include utilizing a Hilbert curve with the discrete space to convert the discrete space to a lower dimensional space (block 540). For example, the device may utilize a Hilbert curve with the discrete space to convert the discrete space to a lower dimensional space, as described above. In some implementations, utilizing the Hilbert curve with the discrete space to convert the discrete space to the lower dimensional space includes utilizing the Hilbert curve with the discrete space to associate a value with each point in the discrete space, and converting the discrete space to the lower dimensional space based on utilizing the Hilbert curve with the discrete space to associate the value with each point in the discrete space.

As further shown in FIG. 5, process 500 may include utilizing the lower dimensional space and the discrete space to transform the object trajectories to binary feature vectors (block 545). For example, the device may utilize the lower dimensional space and the discrete space to transform the object trajectories to binary feature vectors, as described above. In some implementations, utilizing the lower dimensional space and the discrete space to transform the object trajectories to the binary feature vectors includes assigning a particular value to points of the lower dimensional space based on the discrete space, and transforming the object trajectories to the binary feature vectors based on assigning the particular value to points of the lower dimensional space.

As further shown in FIG. 5, process 500 may include processing the binary feature vectors, with a clustering model, to determine trajectory clusters (block 550). For example, the device may process the binary feature vectors, with a clustering model, to determine trajectory clusters, as described above. In some implementations, the clustering model is a hierarchical density-based spatial clustering of applications with noise model.

As further shown in FIG. 5, process 500 may include training a classification model, with the binary feature vectors and the trajectory clusters, to generate a trained classification model (block 555). For example, the device may train a classification model, with the binary feature vectors and the trajectory clusters, to generate a trained classification model, as described above.

As further shown in FIG. 5, process 500 may include performing one or more actions based on the trained classification model (block 560). For example, the device may perform one or more actions based on the trained classification model, as described above. In some implementations, performing the one or more actions includes one or more of causing the trained classification model to be implemented, utilizing the trained classification model to predict new trajectories in real-time, or utilizing the trained classification model to calculate vehicle speeds in real-time. In some implementations, performing the one or more actions includes one or more of utilizing the trained classification model to calculate vehicle idle times in real-time, utilizing the trained classification model to calculate vehicle volume in real-time, or utilizing the trained classification model to identify anomalies in real-time.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, tracking data identifying trajectories of objects;
    annotating, by the device, the tracking data to identify object categories for the tracking data;
    utilizing, by the device, an object detection model to identify the objects based on the object categories;
    processing, by the device, the objects, with a multi-object tracking model, to determine object trajectories for the objects;
    utilizing, by the device, planar homography to transform the object trajectories to overhead planar trajectories;
    processing, by the device, the overhead planar trajectories, with a noise reduction model, to generate simplified object trajectories;
    converting, by the device, a continuous space associated with the simplified object trajectories into a discrete space;
    utilizing, by the device, a Hilbert curve with the discrete space to convert the discrete space to a lower dimensional space;

utilizing, by the device, the lower dimensional space and the discrete space to transform the object trajectories to binary feature vectors;

processing, by the device, the binary feature vectors, with a clustering model, to determine trajectory clusters;

training, by the device, a classification model, with the binary feature vectors and the trajectory clusters, to generate a trained classification model; and performing, by the device, one or more actions based on the trained classification model.

2. The method of claim 1, wherein the tracking data includes video data.

3. The method of claim 1, wherein utilizing the object detection model to identify the objects based on the object categories comprises:

processing the object categories, with a single-stage object detection network model, to identify the objects.

4. The method of claim 1, wherein the multi-object tracking model is a deep simple real-time tracker model.

5. The method of claim 1, wherein the overhead planar trajectories make distances between points of the object trajectories comparable.

6. The method of claim 1, wherein processing the overhead planar trajectories, with the noise reduction model, to generate the simplified object trajectories comprises:

calculating degrees between a current point of one of the overhead planar trajectories and a predetermined quantity of next points of the one of the overhead planar trajectories;

calculating modified z-scores for the degrees; and removing points from the one of the overhead planar trajectories associated with one or more of the modified z-scores that are greater than a threshold score.

7. The method of claim 1, wherein the discrete space retains spatial locality for combinations of coordinate feature vectors of the continuous space associated with the simplified object trajectories.

8. A device, comprising:

one or more memories; and one or more processors, coupled to the one or more memories, configured to:

receive video data that includes image frames identifying vehicles traveling on roadways;

annotate the image frames to identify object categories for the video data;

utilize a single-stage object detection network model to identify objects in the image frames based on the object categories;

process the objects, with a deep simple real-time tracker model, to determine object trajectories for the objects;

utilize planar homography to transform the object trajectories to overhead planar trajectories;

process the overhead planar trajectories, with a noise reduction model, to generate simplified object trajectories;

convert a continuous space associated with the simplified object trajectories into a discrete space;

utilize a Hilbert curve with the discrete space to convert the discrete space to a lower dimensional space;

utilize the lower dimensional space and the discrete space to transform the object trajectories to binary feature vectors;

process the binary feature vectors, with a clustering model, to determine trajectory clusters;

train a classification model, with the binary feature vectors and the trajectory clusters, to generate a trained classification model; and perform one or more actions based on the trained classification model.

9. The device of claim 8, wherein the one or more processors, to convert the continuous space associated with the simplified object trajectories into the discrete space, are configured to:

select a minimum value and a maximum value for each feature in the continuous space;

select a step size for each feature in the continuous space; and convert the continuous space into the discrete space based on the minimum value, the maximum value, and the step size.

10. The device of claim 8, wherein the one or more processors, to utilize the Hilbert curve with the discrete space to convert the discrete space to the lower dimensional space, are configured to:

utilize the Hilbert curve with the discrete space to associate a value with each point in the discrete space; and convert the discrete space to the lower dimensional space based on utilizing the Hilbert curve with the discrete space to associate the value with each point in the discrete space.

11. The device of claim 8, wherein the one or more processors, to utilize the lower dimensional space and the discrete space to transform the object trajectories to the binary feature vectors, are configured to:

assign a particular value to points of the lower dimensional space based on the discrete space; and transform the object trajectories to the binary feature vectors based on assigning the particular value to points of the lower dimensional space.

12. The device of claim 8, wherein the clustering model is a hierarchical density-based spatial clustering of applications with noise model.

13. The device of claim 8, wherein the one or more processors, to perform the one or more actions, are configured to one or more of:

cause the trained classification model to be implemented;

utilize the trained classification model to predict new trajectories in real-time; or utilize the trained classification model to calculate vehicle speeds in real-time.

14. The device of claim 8, wherein the one or more processors, to perform the one or more actions, are configured to one or more of:

utilize the trained classification model to calculate vehicle idle times in real-time;

utilize the trained classification model to calculate vehicle volume in real-time; or utilize the trained classification model to identify anomalies in real-time.

15. A non-transitory computer-readable medium storing a set of instructions, the set of instructions comprising:

one or more instructions that, when executed by one or more processors of a device, cause the device to:

receive video data that includes image frames identifying vehicles traveling on roadways;

annotate the image frames to identify object categories for the video data;

utilize an object detection model to identify objects in the image frames based on the object categories;

process the objects, with a multi-object tracking model, to determine object trajectories for the objects;

utilize planar homography to transform the object trajectories to overhead planar trajectories;
process the overhead planar trajectories, with a noise reduction model, to generate simplified object trajectories;
convert a continuous space associated with the simplified object trajectories into a discrete space;
utilize a Hilbert curve with the discrete space to convert the discrete space to a lower dimensional space;
utilize the lower dimensional space and the discrete space to transform the object trajectories to binary feature vectors;
process the binary feature vectors, with a clustering model, to determine trajectory clusters;
train a classification model, with the binary feature vectors and the trajectory clusters, to generate a trained classification model; and
cause the trained classification model to be implemented with real-time video data.

16. The non-transitory computer-readable medium of claim 15, wherein the object detection model is a single-stage object detection network model and the multi-object tracking model is a deep simple real-time tracker model.

17. The non-transitory computer-readable medium of claim 15, wherein the one or more instructions, that cause the device to process the overhead planar trajectories, with the noise reduction model, to generate the simplified object trajectories, cause the device to:
calculate degrees between a current point of one of the overhead planar trajectories and a predetermined quantity of next points of the one of the overhead planar trajectories;
calculate modified z-scores for the degrees; and
remove points from the one of the overhead planar trajectories associated with one or more of the modified z-scores that are greater than a threshold score.

18. The non-transitory computer-readable medium of claim 15, wherein the one or more instructions, that cause the device to convert the continuous space associated with the simplified object trajectories into the discrete space, cause the device to:
select a minimum value and a maximum value for each feature in the continuous space;
select a step size for each feature in the continuous space; and
convert the continuous space into the discrete space based on the minimum value, the maximum value, and the step size.

19. The non-transitory computer-readable medium of claim 15, wherein the one or more instructions, that cause the device to utilize the Hilbert curve with the discrete space to convert the discrete space to the lower dimensional space, cause the device to:
utilize the Hilbert curve with the discrete space to associate a value with each point in the discrete space; and
convert the discrete space to the lower dimensional space based on utilizing the Hilbert curve with the discrete space to associate the value with each point in the discrete space.

20. The non-transitory computer-readable medium of claim 15, wherein the one or more instructions, that cause the device to utilize the lower dimensional space and the discrete space to transform the object trajectories to the binary feature vectors, cause the device to:
assign a particular value to points of the lower dimensional space based on the discrete space; and
transform the object trajectories to the binary feature vectors based on assigning the particular value to points of the lower dimensional space.

* * * * *